US008065152B2

(12) United States Patent
Ambler (10) Patent No.: US 8,065,152 B2
(45) Date of Patent: Nov. 22, 2011

(54) PLATFORM FOR ENABLING VOICE COMMANDS TO RESOLVE PHONEME BASED DOMAIN NAME REGISTRATIONS

(75) Inventor: Christopher J. Ambler, Redmond, WA (US)

(73) Assignee: Demand Media, Inc., Santa Monica, CA (US)

( * ) Notice: Subject to any disclaimer, the term of this patent is extended or adjusted under 35 U.S.C. 154(b) by 989 days.

(21) Appl. No.: 11/937,436

(22) Filed: Nov. 8, 2007

(65) Prior Publication Data

US 2009/0125308 A1 May 14, 2009

(51) Int. Cl.
*G10L 21/06* (2006.01)
(52) U.S. Cl. ...................................................... 704/270
(58) Field of Classification Search ................... 704/270
See application file for complete search history.

(56) References Cited

U.S. PATENT DOCUMENTS

| | | | |
|---|---|---|---|
| 5,315,689 A | 5/1994 | Kanazawa et al. | |
| 6,532,446 B1 * | 3/2003 | King | 704/270.1 |
| 7,127,394 B2 | 10/2006 | Strong | |
| 7,761,885 B2 * | 7/2010 | Labrou et al. | 719/330 |
| 2005/0075143 A1 | 4/2005 | Choi | |

OTHER PUBLICATIONS

Brown, Robert, "Talking Windows: Exploring New Speech Recognition and Synthesis APIs in Windows Vista," MSDN Magazine, 11 pages, http://msdn.microsoft.com/msdnmag/issues/06/01/speechinWindowsVista/default.aspx?print=true (accessed Sep. 18, 2007).
"Phoneme," Wikipedia, the free encyclopedia, 10 pages, http://en.wikipedia.org/wiki/Phoneme (accessed Jul. 5, 2007).

* cited by examiner

*Primary Examiner* — Susan McFadden
(74) *Attorney, Agent, or Firm* — Greenberg Traurig, LLP (57) ABSTRACT

A method, apparatus, and system are directed towards employing machine representations of phonemes to generate and manage domain names, and/or messaging addresses. A user of a computing device may provide an audio input signal such as obtained from human language sounds. The audio input signal is received at a phoneme encoder that converts the sounds into machine representations of the sounds using a phoneme representation viewable as a sequence of alpha-numeric values. The sequence of alpha-numeric values may then be combined with a host name, or the like to generate a URI, a message address, or the like. The generated URI, message address, or the like, may then be used to communication over a network.

12 Claims, 4 Drawing Sheets

PLATFORM FOR ENABLING VOICE COMMANDS TO RESOLVE PHONEME BASED DOMAIN NAME REGISTRATIONS

TECHNICAL FIELD

The invention relates generally to audio communications, and more particularly, but not exclusively, to employing machine representations of phonemes to generate and manage domain names, and/or a messaging address.

BACKGROUND

The use of mobile technologies is steadily on the increase, for both business and personal uses. Mobile phones are a common sight today and many people own personal information management (PIM) devices, palmtop computers, and so forth, to manage their schedules, contacts, and to stay connected with friends, family, and work. Employees on the move often appreciate the value of staying connected with their business through their mobile devices.

While a user of a mobile device may communicate with others using voice, email, or the like, communications with and/or through various application services on the internet may more commonly be performed using text messages, such as Short Message Service (SMS), Instant Messaging (IM), Multimedia Messaging Service (MMS), Enhanced Message Service (EMS), or the like. However, entering of text within a mobile device is often cumbersome and time consuming. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "phoneme" refers to a physical representation of a human language sound. Moreover, a phoneme is a representation of a sound of a language independent of its position in a word or phrase. Thus, phonemes represent sounds in the most neutral form possible. A variety of written representations of phonemes are known in the art, and as such virtually any representation may be used by the present invention. For example, in one embodiment, the phonemes may be represented by alpha-numeric symbols such as employed in the International Phonetic Alphabet (IPA), American Standard Code for Information Interchange (ASCII) format, or the like. However, as noted, the invention is not limited to this mechanism, and others may be used.

The term Uniform Resource Identifier or "URI" refers to a string or characters that are used to identify or name a resource that may be accessible over a network. The term Uniform Resource Locator, or "URL" is an example of a URI that, in addition to identifying a resource, also indicates a way of acting upon or obtaining a representation of the resource by describing its primary access mechanism or network "location." The term Uniform Resource Name, or "URN" refers to another example of a URI that identifies a resource by name in a particular namespace. As used here, the term URI refers to and includes URLs, URNs, and other types of identifiers for resources accessible over a network.

A messaging address is used to identify a location to which a message is to be delivered or from which a message is sent over a network. A typical email address is a string of the form john@example.com. The part before the @ sign is typically called a local-part of the address, often the username of a recipient, and the part after the @ sign is typically called a domain-part and may be a host name, a domain name, or the like. As used herein, messaging addresses include email addresses, instant messaging (IM) addresses, Short Messaging Service (SMS) addresses, or any other structured format that may identify a location to which a message may be sent over the network.

Briefly stated, the present invention is directed towards employing machine representations of phonemes to generate and manage domain names. In one embodiment, use of the machine representations of phonemes that represent sounds of a human language is directed towards avoiding use of speech recognition tools. Instead, a user of a computing device, such as a mobile device may speak into a microphone an intended domain name. The human language sounds are received at a phoneme encoder that converts the sounds into machine representations of the sounds using a phoneme representation. In one embodiment, the machine representations may be viewed as American Standard Code for Information Interchange (ASCII) representations of the phonemes, or the like, viewable as a sequence of alpha-numeric values. In one embodiment, the machine representations may employ symbols from the International Phonetic Alphabet (IPA) and/or extended sets adapted for use within a computer device. However, the invention is not so limited, and other machine readable representations may also be used. The machine representations may then be used to represent a domain name by adding a top-level domain (TLD), such as a generic TLD, or the like. In one embodiment, the TLD may be ".com." However, in another embodiment, the machine representation may also be modified by adding a second-level domain (SLD), or higher level domain, with the TLD, such as ".vox.com," "keyvox.com," or the like.

For example, in one embodiment, a resulting machine representation of a spoken domain name might look something like: "E1A1E2F1." The conversion to a URI might then appear, for example, something like: "E1A1E2F1.com," "E1A1E2F1.vox.com," or the like. However, the invention is not constrained to this example, and other resulting machine representations may also be used. Thus, the example is not intented to narrow the scope of the invention.

In any event, if the machine representation of the spoken sounds generates a domain name that is not currently registered, the user might be provided with an opportunity to register the representation as a new domain name. However, the invention is not limited to enabling the user the opportunity to register, and any of a variety of other pre-defined actions may be performed. For example, in one embodiment, the user might be presented with domain names that may be similar to that which the user might have intended. In another embodiment, the user might be provided visual representations of similar phoneme domain names, from which the user may then select. In yet another embodiment, the user might be provided an audio list from which the user could also select. In still other embodiment, the user might be provided an error message, indicating that the machine representation of a domain name was not found. In such instance, the user might then select to retry, by re-entering the audio input.

If it is determined, however, that the machine representation is currently registered as a domain name, the mobile device might use the machine representation as a Uniform Resource Identifier (URI) that may be automatically entered into a browser for use in locating and returning webpages associated with the domain name.

The invention is not limited to domain names being represented by machine representations of phonemes. For example, in one embodiment, the machine representations of phonemes might be used as a messaging address. Thus, in one embodiment, the machine representation might be converted to an email address, an Instant Messaging (IM) address, or the like. In one embodiment, the user might be provided with an audio and/or visual representation of the address, and be requested to confirm the address before it is used.

Although the invention does not depend upon voice recognition or other speech recognition mechanisms, in one embodiment, portions of the audio input may be examined and/or filtered to remove extraneous component phonemes. For example, where a user tends to enter extraneous sounds such as "um," "eh," or the like, such machine representations might be filtered out of the audio input. Similarly, in one embodiment, the audio input might be monitored for selected machine representations. For example, where the user provides an audio input seeking "the closest . . . ," or "the best . . . ," the invention might select to filter out such machine representations or use them to further refine the final output. However, in another embodiment, the invention might select to employ a location detection mechanism, such as a global positioning system (gps), or the like, to determine a location of the user. Then, the determined location's machine representation might be automatically combined with the machine representation of at least a portion of the user's audio input. The resulting combination may then be used to search for resulting domain name, or the like. For example, where the user inputs "closest chinese restaurant," the user's location might be combined with the machine representation of "chinese restaurant" to generate a domain name, such as a phoneme representation of "chinese restaurant.inseattle.keyvox.com," or the like.

As noted above, however, the invention is not limited to domain names. Thus, where the user enters selected keywords, machine representations of the keywords might be used to determine an appropriate application. For example, where the user enters "call drycleaner in Seattle," the keyword "call" might be used to determine the application is an audio application. Thus, the invention might convert the audio input "drycleaner in Seattle" to a machine representation, and employ the machine representation to then identify a domain name. The domain name might then be used to determine if there is a corresponding text record in the domain name system for the resulting domain name. If a phone number is located, the phone number may then be used to call an owner of the domain name. Thus, while machine representations for phonemes may be used with domain names, it should be clear that such machine representations are not constrained to merely domain names, and a variety of other applications are also envisaged. Moreover, by filtering the machine representations variations of the audio inputs may be used without a need to perform actual voice recognition. However, it should be clear that voice recognition may be used, for filtering, and/or modifying the machine representations and/or actions taken upon such machine representations, without departing from the scope of the invention.

Illustrative Operating Environment

Figure 1:
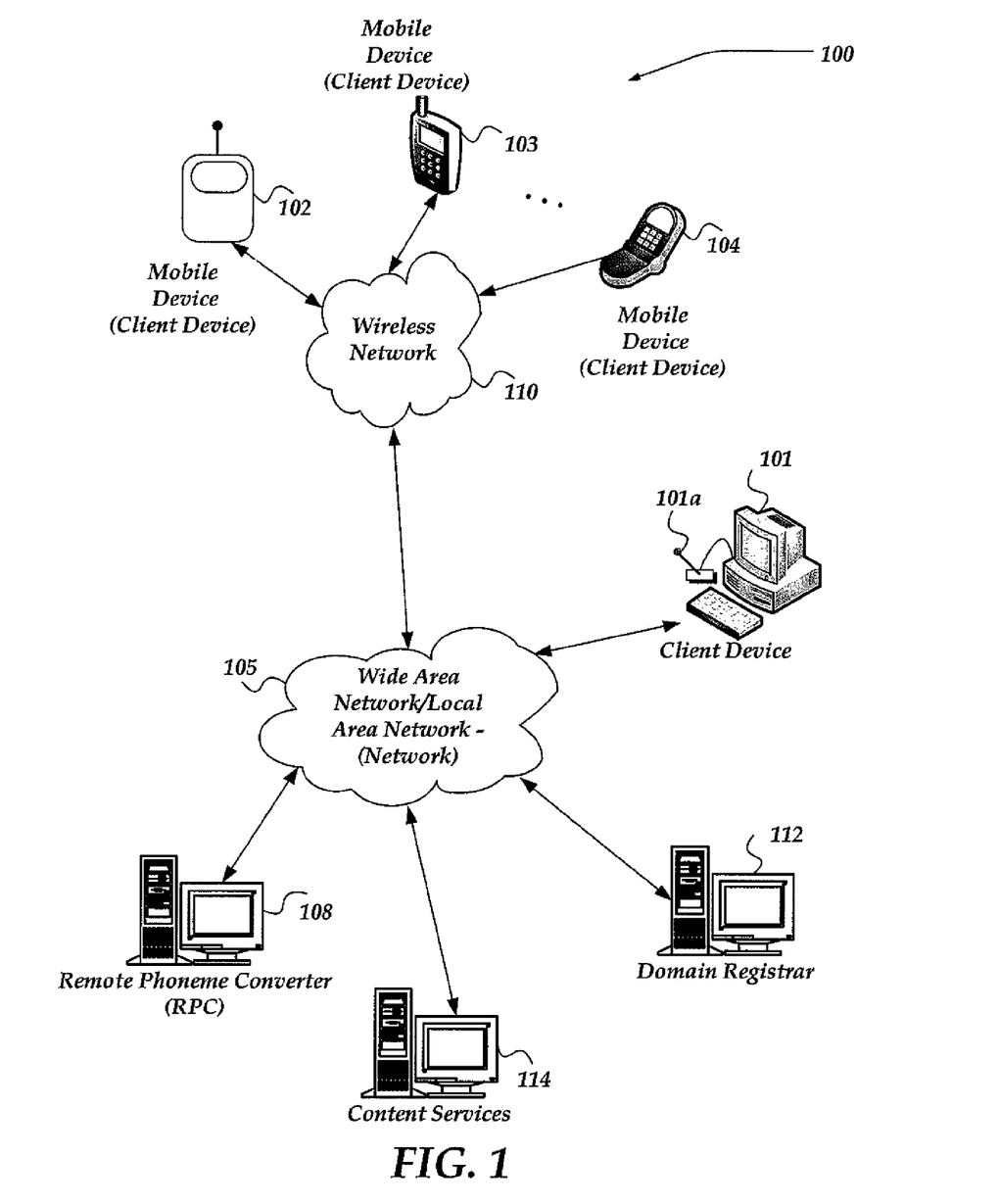
FIG. 1 shows a functional block diagram illustrating one embodiment of an environment for practicing the invention.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, mobile devices (client devices) 102-104, client device 101, domain registrar 112, Remote Phoneme Converter (RPC) 108, and content services 114.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Mobile devices 102-104 also may include at least one other client application that is configured to receive content from another computing device. The client application may include a capability to provide and receive textual content, multimedia information, or the like. The client application may further provide information that identifies itself including a type, capability, name, or the like. In one embodiment, mobile devices 102-104 may uniquely identify themselves through any of a variety of mechanisms, including a phone number, Mobile Identification Number (MIN), an electronic serial number (ESN), network address, or other device identifier. The information may also indicate a content format that the mobile device is enabled to employ. Such information may be provided in a message, or the like, sent to RPC 108, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, or the like, between another computing device, such as RPC 108, client device 101, or the like. However, the present invention is not limited to these message protocols, and virtually any other message protocol may be employed.

In addition, mobile devices 102-104 each may include various audio interfaces, such as a microphone and/or speaker system, that are configured either to receive audio inputs or to provide audio outputs. Mobile devices 102-104 may also include an application that is configured to enable the mobile user to input speech through the microphone, intercept the speech input, and convert at least a portion of the speech into machine representations of phonemes. The application may then, optionally, modify at least a portion of the machine representation by combining and/or deleting portions of the machine representations. For example, the application might search for and delete machine representations of phonemes for such common utterances as "uh," "um," or the like. The application may then determine to what communication application to send the modified machine representation. Such communication applications may include a browser, email, SMS, IM, or the like. In one embodiment, the application might determine whether the modified machine representation is intended for a browser. The application may, in one embodiment, perform a domain name lookup using local cache, and/or domain registrar 112, or other domain name service. In one embodiment, the application might further modify the modified machine representation by combining it with a TLD, or higher level domain name, such that the modified machine representation may then be used as a URI. If the URI is a validly registered UR, it may then be used to access a web page from a corresponding web site, such as from content services 114, or the like. However, the application is not limited to treating the modified machine representation as a domain name (or subsequently, a URI). In one embodiment, the application might instead determine that the communication application is email, SMS, or the like. In which instance, the machine representation might be used as an email address, SMS address, or the like.

The application, may determine the communication application based on a variety of mechanisms. For example, in one embodiment, the user might enter selected keywords, such as "call," "web," "email," or the like. The application might then search the machine representation for corresponding keyword phonemes, and if a keyword is located, it may then be used to select the appropriate communication application. In one embodiment, such keywords may be deleted from the modified machine representations. In one embodiment, the application may employ a process such as described below in conjunction with FIG. 4, to perform at least some of its actions. Moreover, it should be noted that while a single application may be used to perform the actions, the invention is not so limited. For example, a plurality of different applications may be employed to perform the actions, without departing from the scope of the invention. For example, in one embodiment, the keywords might be recognized by a speech recognition application, while other portions of the audio input might be acted upon using a different application, such as described below.

Client device 101 may include virtually any computing device capable of communicating over a network to send and receive information, including requests for web pages, or other type of content. As illustrated, client device 101 may also include a microphone 101a that enables a user to input audio signals, such as speech in to client device 101. Client device 101 may further include, within it and/or external to it, various speaker components that enable the user to hear sounds, including music, speech, or the like. The set of such devices may include devices that typically connect using a wired communications medium such as personal computers, multiprocessor systems, microprocessor-based or programmable consumer electronics, network PCs, or the like. Similarly, client device 101 may include one or more applications as described above in conjunction with mobile devices 102-104. For example, client device 101 may also include one or more applications configured to receive audio inputs, convert them to machine representations of phonemes of the audio inputs, and employ the machine representations, or a modification thereof, as a URI, email address, SMS address, or other messaging address, or the like. Similarly, if the machine representation is employed as a URI, but the URI is unregistered, in one embodiment, the user might be provided an opportunity to register the machine representation as a domain name using domain registrar 112, or the like.

Wireless network 110 is configured to couple mobile devices 102-104 and its components with network 105. Wireless network 110 may include any of a variety of wireless sub-networks that may further overlay stand-alone ad-hoc networks, or the like, to provide an infrastructure-oriented connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between mobile devices 102-104 and another computing device, network, or the like.

Network 105 is configured to enable communications between various computing devices, including RPC 108, domain registrar 112, content services 114, client device 101, and through wireless network 110 with mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of RPC 108 is described in more detail below in conjunction with FIG. 3. Briefly, however, RPC 108 may include any computing device capable of connecting to network 105 to enable client devices 101-104 to remotely convert audio inputs into machine representations of phonemes for use as URIs, messaging addresses, or the like. Thus, in one embodiment, where a client device 101-104 might not include an application to perform the actions described above, RPC 108 may be used. Thus, RPC 108 illustrates one embodiment, in which the audio input, such as a user's speech may be converted remotely, rather than within the client device. Devices that may operate as RPC 108 include personal computers desktop computers, multiprocessor systems, microprocessor-based or programmable consumer electronics, network PCs, servers, or the like.

Content services 107 represents a variety of computing devices that may provide information and/or services for use by client devices 101-104. Content services 107 may provide the information and/or services using a variety of mechanisms, including through websites accessible via a URI, FTP access, database services, messaging services, or the like. Devices that may operate as content services 107 include personal computers desktop computers, multiprocessor systems, microprocessor-based or programmable consumer electronics, network PCs, servers, or the like.

Domain registrar 112 represents virtually any computing system configured and accredited by the Internet Corporation for Assigned Names and Numbers (ICANN) and/or by another TLD authority to register Internet domain names. Moreover, in one embodiment, domain registrar 112 may also be configured and arranged to provide Domain Name System (DNS) hosting services. Thus, in one embodiment, domain registrar 112 may also be enabled to receive a domain name, such as a machine representation of a phoneme, and determine if a corresponding network address, such as an Internet Protocol (IP) address, exists. Moreover, in one embodiment, domain registrar 112 may also receive a request from an application to determine whether there is a corresponding phone number associated with the received domain name, and if so, to provide the phone number to the requester. If the received domain name is not resolvable into an IP address, or the like, due, perhaps to the domain name not being registered, domain registrar 112 may then perform a defined action. Such defined actions may, in one embodiment, include providing a web page to the requester that permits the requester to register the domain name. In another embodiment, domain registrar 112 might, for the un-resolvable domain name, provide possible suggestions of similar registered domain names from which the requester might then select. In still another embodiment, the user might be sent to a web site that domain registrar 112, or another application, determines is a most likely web site to satisfy the user's request. Such determination may be based on any of a variety of criteria, including, but not limited to at least a partial speech analysis, information obtained about browsing history of the user, information about the user's preferences, location, or the like. However, the defined actions are not constrained to these actions, and a variety of other actions might be performed when the domain name can not be resolved into a corresponding IP address, or the like.

It should be noted, that while domain registrar 112 may include DNS hosting services, the invention is not so limited. For example, such DNS hosting services may also be provided through one or more other computing devices (not illustrated), in another embodiment, without departing from the scope of the invention.

Illustrative Mobile Client Environment

Figure 2:
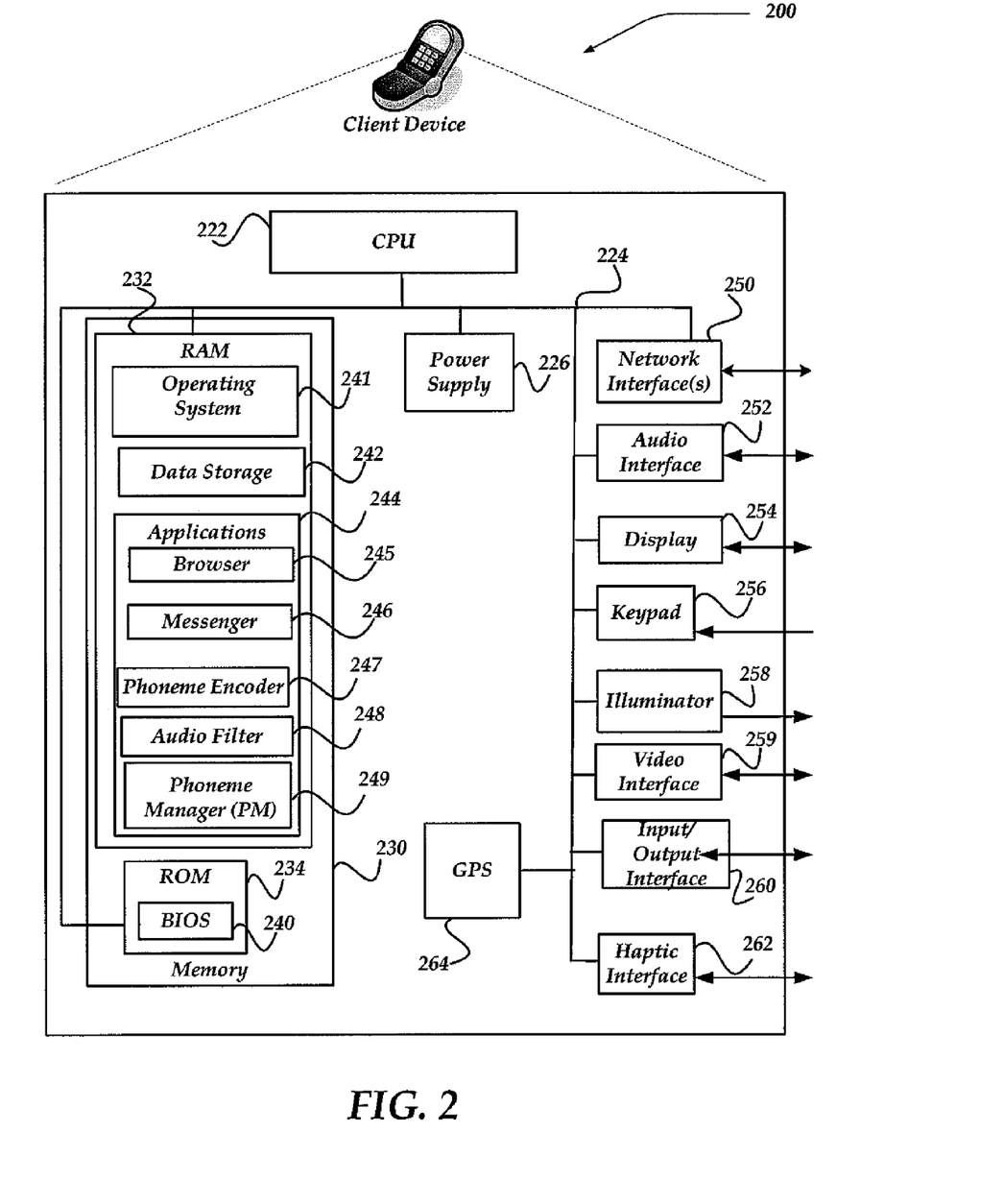
FIG. 2 shows one embodiment of a client device that may be included in a system such as illustrated in FIG. 1.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (JDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Audio interface 252 may also receive the audio input signal, and provide the signal to another component of client device 200, such as phoneme encoder 247, or the like.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store other information including address lists, contact lists, personal preferences, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications may also include browser 245, messenger 246, phoneme encoder 247, audio filter 248, and phoneme manager (PM) 249. It should be noted, that while phoneme encoder 247, audio filter 248, and phoneme manager (PM) 249 are illustrated as separate applications, the invention is not so limited. For example, in one embodiment, phoneme encoder 247 and audio filter 248 may be sub-components, or otherwise integrated within phoneme manager (PM) 249. Similarly, other arrangements are also envisaged. For example, in one embodiment, PM 249 might be configured to employ a phoneme encoder and/or audio filter that are remote from client device 200, without departing from the scope of the invention.

Messenger 246 may be configured to manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 246 may be configured as an IM application, such as AOL Instant Messenger, Yahoo! Messenger, .NET Messenger Server, ICQ, or the like. In another embodiment, messenger 246 might represent any of a variety of email messaging client applications. In another embodiment, messenger 246 may be a client application that is configured to integrate and employ a variety of messaging protocols. Typically, messages may be communicated to another computing device using a messaging address. Thus, messenger 246 may employ, for example, a messaging address as a destination address. In one embodiment, messenger 246 might receive a messaging address that is generated from PM 249. In one embodiment, messenger 246 might display the messaging address for a user to confirm that the address is an intended messaging address.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed. In one embodiment, browser 245 may receive a URI from PM 249, for use in communicating over a network. The URI might be searched within a local cache, such as data storage 242, or the like, to attempt to resolve the URI to a network address, such as an IP network address, or the like. In one embodiment, the URI may be provided to a remote computing device to be resolved. The remote computing device may then provide a result of a lookup, or the like, an error message, a selection of similar URIs, advertisements, or the like. In one embodiment, the URI may be used to obtain a phone number associated with the URI.

Phoneme encoder 247 is configured and arranged to receive an audio input signal and to convert the audio input signal into a phoneme representation. In one embodiment, phoneme encoder 247 may receive the audio input signal, isolate segments of sounds, and convert them into a series of numeric values that characterize the vocal sounds in the signal. The intent of phoneme encoder 247 is to avoid performing actual speech recognition, and instead, fundamentally, to stop the conversion process of the audio input signal once the signal is converted into the phoneme representations. Thus, such output of phoneme encoder 247 might appear to be a readable sequence of alpha-numeric characters, such as "E1A4," or the like. In one embodiment, the conversion may employ a machine encoding using symbols from the International Phonetic Alphabet (IPA). However, the invention is not limited to this representation, and others, extensions of the IPA, or the like, may also be used. Phoneme encoder 247 may be implemented using any of a variety of encoding mechanisms, including, for example, components selected from Speech Recognition and Synthesis APIs, such as Speech API (SAPI) by Microsoft, or the like. Thus, in one embodiment, phoneme encoder 247 may include "off-the-shelf" components, or the like, that may employ W3C's Speech Synthesis Markup Language (SSML), and/or W3C's Speech Recognition Grammar Specification (SRGS) to represent voice characteristics, and the like.

In one embodiment, for example, phoneme encoder 247 may receive the audio input signal and isolate segments of sounds based on variety of factors, including, but not limited, to tone changes, volume changes, detected breaks and/or pauses in the audio input signal, or the like. In one embodiment, phoneme encoder 247 may employ a table, spreadsheet, or other lookup mechanism to compare isolated segments to stored segments. In one embodiment, if the received segment matches a stored segment within a defined degree of certainty, then phoneme encoder 247 outputs a phoneme associated with the stored segment. However, it should be clear that phoneme encoder 247 may employ virtually any encoding mechanism that enables audio input to be converted to a phoneme representation, or the similar structure, format, or the like. Thus, these examples are not intended to be limiting in any manner.

Phoneme encoder 247 may then provide the sequence of alpha-numeric characters to PM 249. PM 249 is configured and arranged to receive the sequence and to determine an application for which the sequence is to be used. In one embodiment, PM 249 might determine the application based on recognition of a sub-set of the sequence of alpha-numeric characters. For example, in one embodiment, the sequence might include a sequence representing the audio input signals for "call," "browser," "email," or the like. PM 249 is not limited to determining the client application by which the sequence is to used based on the sequence, or a part thereof. Thus, in one embodiment, PM 249 may also determine whether an application is currently active, receive a signal such as an icon selection by a user, or the like, to determine the client application.

In one embodiment, if PM 247 determines that the sequence is to be used as a URI, PM 247 may generate a URI by combining the sequence of alpha-numeric values with at least a top level domain identifier, or the like. Thus, for example, where the sequence appears as "E2A6B3," PM 247 might append a .com, or the like, to the sequence to generate a URI such as E2A6B3.com. However, PM 247 might also append a third or other level domain identifiers. For example, PM 247 might generate a URI, such as E2A6B3.keyvox.com, or the like.

In one embodiment, PM 247 might employ optional audio filter 248 to modify the sequence by deleting defined phonemes, adding defined phonemes, or the like, prior to generating the URI. For example, if audio filter 248 identifies a phoneme that represents extraneous speech sounds, such as, "and," "eh," "um," "like," or so forth, audio filter 248 might be employed to remove such phoneme representations from the sequence. In one embodiment, audio filter 248 might also be used to identify other keywords, such as "best," "closest," or the like, and also delete them, or alternatively, audio filter 248 might be employed to add one or more of the keywords to the sequence in a phoneme representation. In one embodiment, the extraneous sounds might be recognized using speech recognition; however, audio filter 248 is not so limited, and any of a variety of other mechanisms may also be employed. In another embodiment, location information might be obtained from GPS 264, or the like, and used to modify the alpha-numeric values. Thus, in one embodiment, PM 247 may employ audio filter 248 to vary the initial input in any of a variety of ways. However, such filtering is optional and need not be performed for the invention to provide a URI.

If PM 249 determines that the client application is a messaging application, PM 249 might generate a messaging address by combining the sequence of alpha-numeric values with at least a message address domain-part. For example, in one embodiment, PM 249 might have a set of defined domain-parts, such as att.net, verizon.net, or the like, that may be used as domain-parts. PM 249 might then select one of the domain-parts based on a variety of criteria, and provide the resulting messaging address to a messaging application, such as messenger 246. In one embodiment, a user might specify the domain-part by a user selection. The messaging address may then be generated. Using the example above, the messaging address could appear like: E2A6B3@verizon.net, or the like. However, it should be noted that other formats might also be generated. For example, the phoneme representation might be pre-pended, appended, or otherwise modified. For example, in one embodiment, for a voice-based messaging address, the encoding might appear like: VOX-E2A6B3@verizon.net, where the "VOX-" might denote that the address was generated for voice. A mail server might then use the prefix "VOX-" to direct the message. In still another example, the address could appear like: E2A6B3@keyvoxverizon.net, using a third-level domain to indicate that the first part of the address (left of the @) is encoded. It should be noted that other applications and other phoneme formatted addresses may also be used, and the invention is not limited by the examples provided. Moreover, PM 249 may use a process substantially similar to that described below in conjunction with FIG. 4.

Illustrative Server Environment

Figure 3:
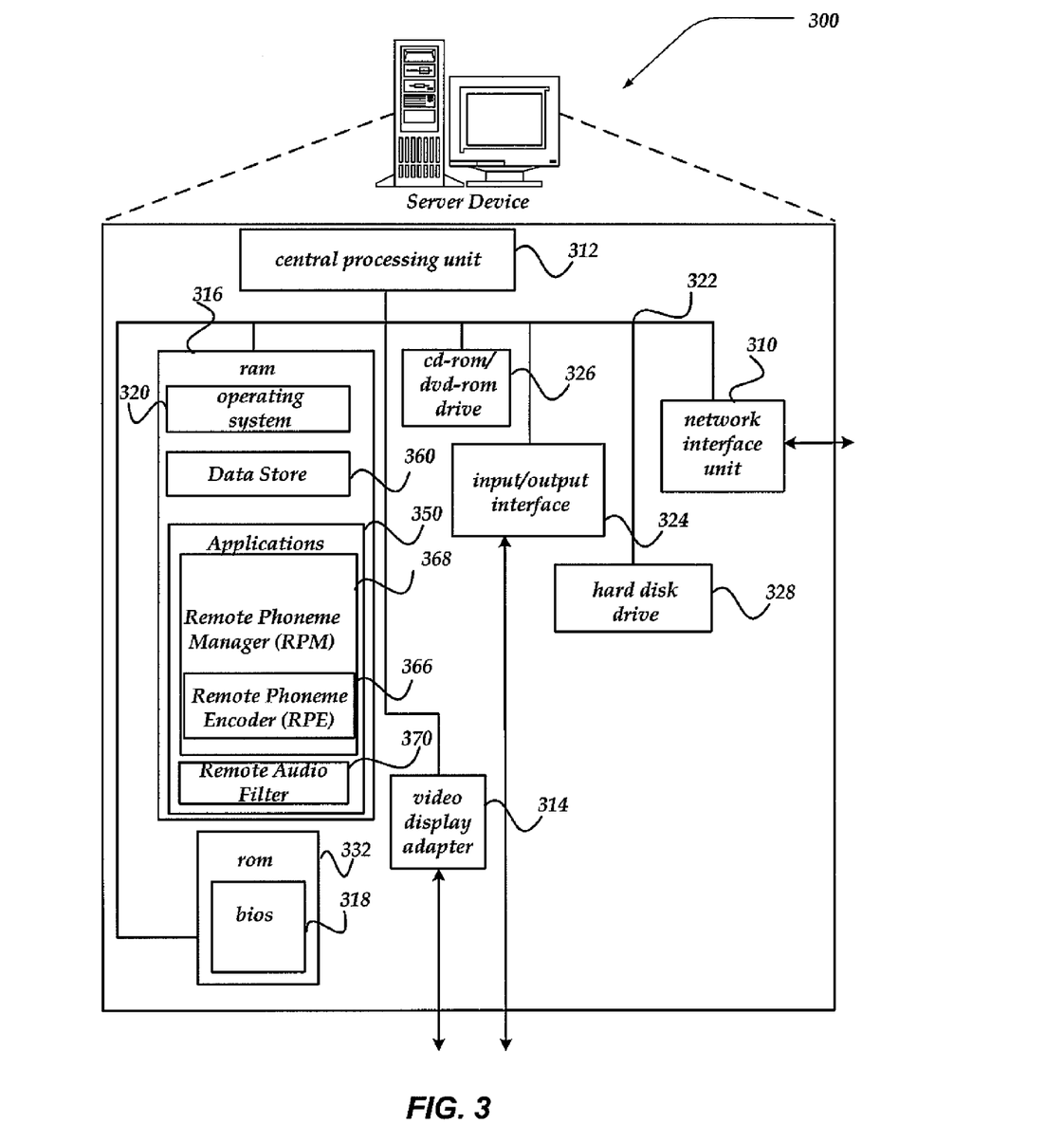
FIG. 3 shows one embodiment of a server device that may be included in a system such as illustrated in FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, RPC 108 of FIG. 1. Thus, network device 300 may be considered as another embodiment, wherein the phoneme encoding may be performed by a device remote from a client application.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Data Store 360 may be included in mass memory, while, Remote Phoneme Manager (RPM) 368 may also be included within applications 350.

Data Store 360 is configured and arranged to manage and store any of a variety of information, including, but not limited to phoneme representations, domain-parts, rules, client information, or the like. In one embodiment, data store 360 may be a database, a file structure, or the like. Data store 360 may store the information into a category structure, such as folders, albums, graphs, trees, or the like.

RPM 368 may also include remote phoneme encoder (RPE) 366. In one embodiment, RPM 368 may also include remote audio filter 370. However, in another embodiment, as illustrated, remote audio filter 370 may be a distinct optional application. RPM 368, RPE 366, and remote audio filter 370 are configured and arranged to operate substantially similar to their client device applications: PM 249, phoneme encoder 247, and audio filter 248, respectively. However, at least one difference is that RPM 368, RPE 366, and remote audio filter 370 may be configured to manage inputs from a plurality of different client devices.

Generalized Operation

Figure 4:
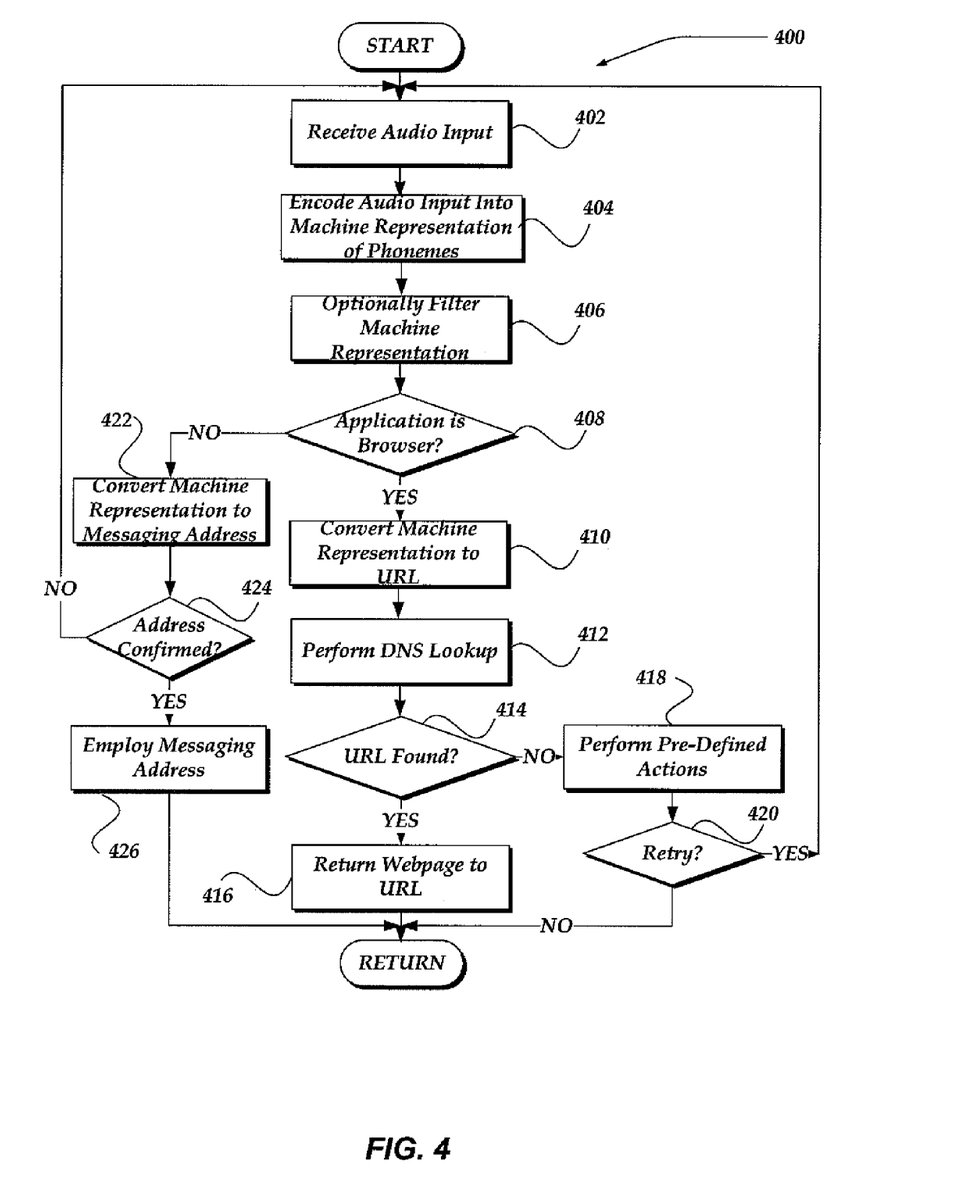
FIG. 4 illustrates a logical flow diagram generally showing one embodiment of an overview process for employing machine generated representations of human language sounds through phonemes to manage at least phoneme based domain names.

The operation of certain aspects of the invention will now be described with respect to FIG. 4. FIG. 4 illustrates a logical flow diagram generally showing one embodiment of an overview process for employing machine generated representations of human language sounds through phonemes to manage at least phoneme based domain names.

Process 400 begins, after a start block, at block 402, where an audio input signal is received. It is expected that the audio input signal is that of a human speech pattern. Recognition of the words spoken is not relevant to the invention; instead, the invention is directed towards encoding the signal into a phoneme representation of the signal, which is performed at block 404. Thus, a machine representation of the audio signal is determined using phoneme representations of the sounds. In one embodiment, the result may be a sequence of alpha-numeric values that represent the written phonemes for the sounds.

Processing continues next to block 406, where optional audio filtering such as described above may be performed. Such audio filtering may include deleting defined phonemes from the sequence, adding defined phonemes to the sequence, or the like. Process 400 flows next to decision block 408, where a determination is made whether the client application to employ the sequence is a browser or other URI useable application. If so, processing flows to block 410; otherwise, processing flows to block 422. It should be noted, that the invention is not limited to merely testing for a URI or messaging application (block 422), and other determinations may also be performed for other applications. Moreover, in one embodiment, it may be presumed that the input is always one type or another, and thus, decision block 408 might be omitted, and the relevant steps always performed based on the assumption.

In any event, at block 410, a URI may be generated by combining the sequence of alpha-numeric values with at least a top level domain identifier, such as .com, .gov, .edu, or the like. In one embodiment, additional domain identifiers may also be included. For example, .keyvox.com, or the like, may be provided. In one embodiment, the domain identifier(s) may be appended to the sequence with a 'dot' separator between the sequence and the domain identifiers.

Processing then flows to block 412, where a domain name service (DNS) lookup may be performed using the browser, or other relevant client application, to resolve the URI. At decision block 414, a determination is made whether the URI is found. If not, processing flows to block 418; otherwise, processing flows to block 416.

At block 418, any of a variety of pre-defined actions may occur. For example, in one embodiment, an error message may be sent to the client application. In another embodiment, the client application might receive and display a list of similar URIs. In still another embodiment, the client application might display an offer to the user to register the URI. The user might also be provided an advertisement based on the URI. The invention is not limited to these actions, and others, and/or a combination of the above actions, may also be performed, without departing from the scope of the invention. For example, on another embodiment, the user might be displayed a list of words that might be similar to what the alpha-numeric sequence might be recognized as using a speech recognition tool, or the like. Processing may flow next to decision block 420, where the user may be offered an option to retry another audio input signal. If so, processing loops back to block 402; otherwise, process 400 may return to a calling process to perform other actions.

At block 416, however, because the URI was able to be resolved to a network address, such as an IP address, or the like, the resolved address may be used to communicate over the network a request for content at that address. For example, in one embodiment, a webpage might be returned that is located at the address associated with the phoneme encoded URI. Processing then may return to a calling process to perform other actions.

At block 422, however, it may be determined that the phoneme encoding is directed towards a messaging address, such as an email address, IM address, or the like. Thus, the alpha-numeric sequence may be combined with a domain-part, or host-part, or the like, to generate a messaging address. In one embodiment, the alpha-numeric sequence might be separated from the domain/host-part with an @ separator, or the like. In one embodiment, the user might have been provided with a list of optional domain/host-parts from which to select, to generate the messaging address.

Processing then flows to decision block 424, where the resulting messaging address may be displayed for confirmation by a user. If the messaging address is confirmed, processing flows to block 426, where the messaging address may be provided to a messenger application for use in communicating over the network a message. Processing then returns to a calling process to perform other actions. If however, the address is not confirmed, processing may loop back to block 402 to allow the user to provide a different audio input signal.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A non-transitory processor readable medium storing instructions, wherein the execution of the instructions on a computing device provides for managing communications over a network by enabling actions, comprising:
   receiving a voice input signal;
   isolating segments of the voice input signal;
   converting the isolated segments into a sequence of alpha-numeric values, wherein each of the alpha-numeric values are configured and arranged as phoneme representations of the voice input signal;
   determining if the voice input signal is to be employed for use in a domain name based on an input from a user of the computing device;
   if the voice input signal is to be employed for use in a domain name, generating a Uniform Resource Identifier (URI) by appending to the sequence of alpha-numeric values at least a top level domain identifier; and
   if the URI is registered, employing the URI to communicate over the network with another computing device.

2. The non-transitory processor readable medium of claim 1, wherein the actions further comprise: if the URI is determined to be unregistered, receiving a request to register the URI.

3. The non-transitory processor readable medium of claim 1, wherein converting the isolated segments into a sequence of alpha-numeric values further comprises:
   searching within the sequence of alpha-numeric values for pre-defined subsequences, and if the pre-defined subsequence is detected, deleting the pre-defined sub-sequence from within the sequence of alpha-numeric values.

4. The non-transitory processor readable medium of claim 1, wherein generating the URI further comprises combining with the sequence of alpha-numeric values a pre-defined subsequence of alpha-numeric values.

5. The non-transitory processor readable medium of claim 1, wherein the actions further comprise:
   if the input or the client application status indicates that the voice input signal is to be employed for a messaging application, generating a messaging address by combining the sequence of alpha-numeric values with at least a message address domain-part; and employing the generated messaging address as a destination address within a message header.

6. The non-transitory processor readable medium of claim 1, wherein generating the URI further comprises appending to the sequence of alpha-numeric values at least a second level domain identifier.

7. A network device to manage a mobile sharing of multimedia content, comprising:

a transceiver to send and receive data over a network; and a processor that is operative to perform actions, comprising:

receiving, from a client device, a voice input signal;

converting the voice input signal into a sequence of alpha-numeric values, wherein each of the alpha-numeric values are configured and arranged to represent phonemes of the voice input signal;

determining if the voice input signal is to be employed for use in a domain name based on an input from a user of the client device;

if the voice input signal is to be employed for use in a domain name, generating a Uniform Resource Identifier (URI) by appending to the sequence of alpha-numeric values at least a top level domain identifier; and providing to the client device the generated URI for use by the client device in communicating over the network.

8. The network device of claim 7, wherein the processor is operative to perform actions, further comprising:

if the voice input signal is to be employed in a messaging client application, generating a messaging address by combining the sequence of alpha-numeric values with at least a message address domain-part; and providing the client device the generated message address for use by the client device in communicating a message over the network.

9. The network device of claim 7, wherein if the voice input signal is to be employed for use in a domain name is determined based on a signal from the client device.

10. The network device of claim 7, wherein generating the URI further comprises deleting from the sequence of alpha-numeric values defined sub-sequences.

11. A non-transitory processor readable medium storing instructions, wherein the execution of the instructions on a computing device provides for managing communications over a network by enabling actions, comprising:

receiving a voice input signal;

isolating segments of the voice input signal;

converting the isolated segments into a sequence of alpha-numeric values, wherein each of the alpha-numeric values are configured and arranged as phoneme representations of the voice input signal;

determining if the voice input signal is to be employed for use in a domain name based on at least one of an input from a user of the computing device, and a status of a client application on the computing device;

if the voice input signal is to be employed for use in a domain name, generating a Uniform Resource Identifier (URI) by appending to the sequence of alpha-numeric values at least a top level domain identifier;

if the URI is registered, employing the URI to communicate over the network with another computing device;

if the input or the client application status indicates that the voice input signal is to be employed for a messaging application, generating a messaging address by combining the sequence of alpha-numeric values with at least a message address domain-part; and employing the generated messaging address as a destination address within a message header.

12. A network device to manage a mobile sharing of multimedia content, comprising:

a transceiver to send and receive data over a network; and at least one processor that is operative to perform actions, comprising:

receiving, via the transceiver, from a client device, a voice input signal;

converting the voice input signal into a sequence of alpha-numeric values, wherein each of the alpha-numeric values are configured and arranged to represent phonemes of the voice input signal;

if the voice input signal is to be employed for use in a domain name, generating a Uniform Resource Identifier (URI) by appending to the sequence of alpha-numeric values at least a top level domain identifier;

providing, via the transceiver, to the client device the generated URI for use by the client device in communicating over the network;

if the voice input signal is to be employed in a messaging client application, generating a messaging address by combining the sequence of alpha-numeric values with at least a message address domain-part; and providing, via the transceiver, the client device the generated message address for use by the client device in communicating a message over the network.

\* \* \* \* \*